US009372689B2

(12) United States Patent
Frenkiel et al.

(10) Patent No.: US 9,372,689 B2
(45) Date of Patent: Jun. 21, 2016

(54) SYNCHRONIZING COMMENTS IN SOURCE CODE WITH TEXT DOCUMENTS

(71) Applicant: International Business Machines Corporation, Armonk, NY (US)

(72) Inventors: Andrew Lawrence Frenkiel, Carlton Victoria (AU); Michael Priestly, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 14/288,983

(22) Filed: May 28, 2014

(65) Prior Publication Data

US 2015/0347128 A1 Dec. 3, 2015

(51) Int. Cl.
*G06F 9/44* (2006.01)
*G06F 9/45* (2006.01)

(52) U.S. Cl.
CPC .. *G06F 8/73* (2013.01); *G06F 8/20* (2013.01); *G06F 8/36* (2013.01)

(58) Field of Classification Search
CPC . G06F 11/28; G06F 11/3612; G06F 11/3616; G06F 8/73; G06F 8/36; G06F 8/20; G06F 8/71; G06F 8/75; G06F 8/35
See application file for complete search history.

(56) References Cited

U.S. PATENT DOCUMENTS

| | | | | |
|---|---|---|---|---|
| 8,387,010 B2* | 2/2013 | Hashimoto | ............... | G06F 8/36 717/101 |
| 8,433,687 B1* | 4/2013 | Pydi | ......................... | G06F 8/71 707/610 |
| 9,009,664 B2* | 4/2015 | Muddu | ..................... | G06F 8/75 717/121 |
| 9,110,769 B2* | 8/2015 | Zhang | ...................... | G06F 8/751 |
| 9,201,632 B2* | 12/2015 | Somani | ..................... | G06F 8/30 |
| 9,256,422 B2* | 2/2016 | Grechanik | ............... | G06F 8/70 |
| 2004/0061719 A1* | 4/2004 | Barsness | ................... | G06F 8/73 715/760 |
| 2007/0240101 A1 | 10/2007 | Wilson | | |
| 2008/0263518 A1 | 10/2008 | Bank et al. | | |
| 2008/0270991 A1 | 10/2008 | Zeidman | | |
| 2008/0295085 A1 | 11/2008 | Rachamadugu et al. | | |

OTHER PUBLICATIONS

Sommerlad et al., Retaining comments when refactoring code, Oct. 2008, 9 pages.*
McMillan et al., Recommending source code examples via API call usages and documentation, May 2010, 5 pages.*

(Continued)

*Primary Examiner* — Thuy Dao
(74) *Attorney, Agent, or Firm* — Fleit Gibbons Gutman Bongini & Bianco PL; Thomas Grzesik

(57) ABSTRACT

Various embodiments synchronize comments in a source code file with text of a source code document. In one embodiment, a source code document is compared to a corresponding source code file. The source code document comprises a set of text corresponding to a set of source code comment text in the corresponding source code file. The source code document is configured to display the set of text in a stylized format when presented to a user. The set of text in the source code document is determined to be different than the set of source code comment text in the source code file based on the comparison. At least the set of source code comment text in the source code file is automatically changed based on the set of text from the source code document and in response to the determination.

14 Claims, 7 Drawing Sheets

(56) References Cited

OTHER PUBLICATIONS

Zhong et al., Detecting API documentation errors, Oct. 2013, 13 pages.*

DeLucia, A., et al., "Improving Source Code Lexicon via Traceability and Information Retrieval," IEEE Transactions on software engineering, Apr. 2011, pp. 205-226, vol. 37, Issue No. 2, 0098-5589/11, copyright 2011 IEEE.

Rojas, S., et al., "Source code documentation simul loco," Information Systems and Technologies (CISTI), 2012 7th Iberian Conference on Information and Technologies, (CISTI) IEEE, Jun. 2012, pp. 1-4, Spain.

Myers, S., et al., "Source Code Documentation: When Comments Get in the Way," SAS Conference proceedings: South East SAS users group, 2006.

\* cited by examiner

```
  Vwap.spl  ✕                                                                                       ⌐202
 1  /**                          ⟵210                                                                ⌐204
 2   = Overview
 3      Given an input file containing trades and quotes, this composite operator produces
 4   an output file called |||out||| in the toolkit's |||data||| directory.
 5
 6   The output file lists the VWAP and bargain index for the last 4 trades. The trades included in
 7   the VWAP computation are grouped by the |||Aggregate||| operator.
 8   The bargain index identifies the magnitude of the bargain, where a greater values implies
 9   a better bargain. A value of 0 indicates that the VWAP is not greater than the asking price,
10   and is therefore not a bargain.
11                          ⟵214
12   = Example
13   A few records from the output file are show below:
14   {|||
15   {ticker="IBM",vwap=83.63,askprice=83.63,asksize=2,ts="Tue Dec 27 14:31:05 2005",index=2036325952779588}
16   {ticker="IBM",vwap=83.648,askprice=83.58,asksize=2,ts="Tue Dec 27 14:31:08 2005",index=2140730616957548}
17   {ticker="IBM",vwap=83.648,askprice=83.58,asksize=1,ts="Tue Dec 27 14:31:08 2005",index=1070365308478774}
18   {ticker="IBM",vwap=83.5653333333333,askprice=83.58,asksize=5,ts="Tue Dec 27 14:31:13 2005",index=0}
19   |||}
20   These output records are produced by the |||FileSink||| operator. Each record shows the contents of the
21   tuples received on the |||BargainIndex||| stream as a set of tuple attributes. The attributes are formatted
22   as a key-value pair. The |||vwap||| and |||index||| attributes contains the value-weighted average price a
23   bargain index, respectively.
24   */       ⟵212
25   composite Vwap {        ⟵208
26      param
        ...
```
⏟
206

FIG. 2

```
1   /**
2    * = Overview
3    * Given an input file containing trades and quotes, this composite operator produces
4    * an output file called ||| out ||| in the toolkit's ||| data ||| directory.
5    *
6    * The output file lists the VWAP and bargain index for the last 4 trades. The trades included in
7    * the VWAP computation are grouped by the ||| Aggregate ||| operator, which uses a sliding window
8    * to sum the weighted price and volume for the 4 most recent transactions.
9    * The bargain index identifies the magnitude of the bargain, where a greater values implies
10   * a better bargain. A value of 0 indicates that the VWAP is not greater than the asking price,
11   * and is therefore not a bargain.
12   *
13   * = Example
14   * A few records from the output file are show below:
15   * |||
16   * {ticker="IBM",vwap=83.648,askprice=83.63,asksize=2,ts="Tue Dec 27 14:31:05 2005",index=2036.32595277958}
17   * {ticker="IBM",vwap=83.648,askprice=83.58,asksize=2,ts="Tue Dec 27 14:31:08 2005",index=2140.7306169575748}
18   * {ticker="IBM",vwap=83.648,askprice=83.58,asksize=1,ts="Tue Dec 27 14:31:08 2005",index=1.070365308478774}
19   * {ticker="IBM",vwap=83.565333333333333,askprice=83.58,asksize=5,ts="Tue Dec 27 14:31:13 2005",index=0}
20   * |||
21   * These output records are produced by the ||| FileSink ||| operator. Each record shows the contents of the
22   * tuples received on the ||| BargainIndex ||| stream as a set of tuple attributes. The attributes are formatted
23   * as a key-value pair. The ||| vwap ||| and ||| index ||| attributes contains the value-weighted average price a
24   * bargain index, respectively.
25   */
26  composite Vwap {
        ...
```

FIG. 5

SYNCHRONIZING COMMENTS IN SOURCE CODE WITH TEXT DOCUMENTS

BACKGROUND

The present disclosure generally relates to source code, and more particularly relates to synchronizing comments in source code with text documents.

Publishing product quality documentation on application programming interfaces typically requires the collaboration of programmers and professional technical writers. Programmers generally add text to comment areas in the source code, while professional technical writers edit and format the source code comments so that they are suitable for presentation to customers. Generally, a manual and, thus, cumbersome and error prone process is required to keep the comments in the source code synchronized with improvements to the documentation made by technical writers. Likewise, changes in the source code and associated comments implemented by programmers usually need to be manually merged with the documentation.

BRIEF SUMMARY

In one embodiment, a method for synchronizing comments in a source code file with text of a source code document is disclosed. The method comprises comparing a source code document to a corresponding source code file. The source code document comprises a set of text corresponding to a set of source code comment text in the corresponding source code file. The source code document is configured to display the set of text in a stylized format when presented to a user. The set of text in the source code document is determined to be different than the set of source code comment text in the source code file based on the comparison. At least the set of source code comment text in the source code file is automatically changed based on the set of text from the source code document and in response to the source code document being different than the set of source code comment text in the source code file.

In another embodiment, an information processing system for synchronizing comments in a source code file with text of a source code document is disclosed. The information processing system comprises memory and at least one processor communicatively coupled to the memory. A source code comment synchronizer is communicatively coupled to the memory and the processor. The source code comment synchronizer is configured to perform a method. The method comprises comparing a source code document to a corresponding source code file. The source code document comprises a set of text corresponding to a set of source code comment text in the corresponding source code file. The source code document is configured to display the set of text in a stylized format when presented to a user. The set of text in the source code document is determined to be different than the set of source code comment text in the source code file based on the comparison. At least the set of source code comment text in the source code file is automatically changed based on the set of text from the source code document and in response to the source code document being different than the set of source code comment text in the source code file.

In a further embodiment, a computer program product for synchronizing comments in a source code file with text of a source code document is disclosed. The computer program product comprises a storage medium readable by a processing circuit and storing instructions for execution by the processing circuit for performing a method. The method comprises comparing a source code document to a corresponding source code file. The source code document comprises a set of text corresponding to a set of source code comment text in the corresponding source code file. The source code document is configured to display the set of text in a stylized format when presented to a user. The set of text in the source code document is determined to be different than the set of source code comment text in the source code file based on the comparison. At least the set of source code comment text in the source code file is automatically changed based on the set of text from the source code document and in response to the source code document being different than the set of source code comment text in the source code file.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 2 illustrates one example of a source code file, according to one embodiment of the present disclosure;

FIG. 5 illustrates another example of the source code document of FIG. 2 after being updated based on changes made to the source code document of FIG. 3, according to one embodiment of the present disclosure.

DETAILED DESCRIPTION

Operating Environment

Figure 1:
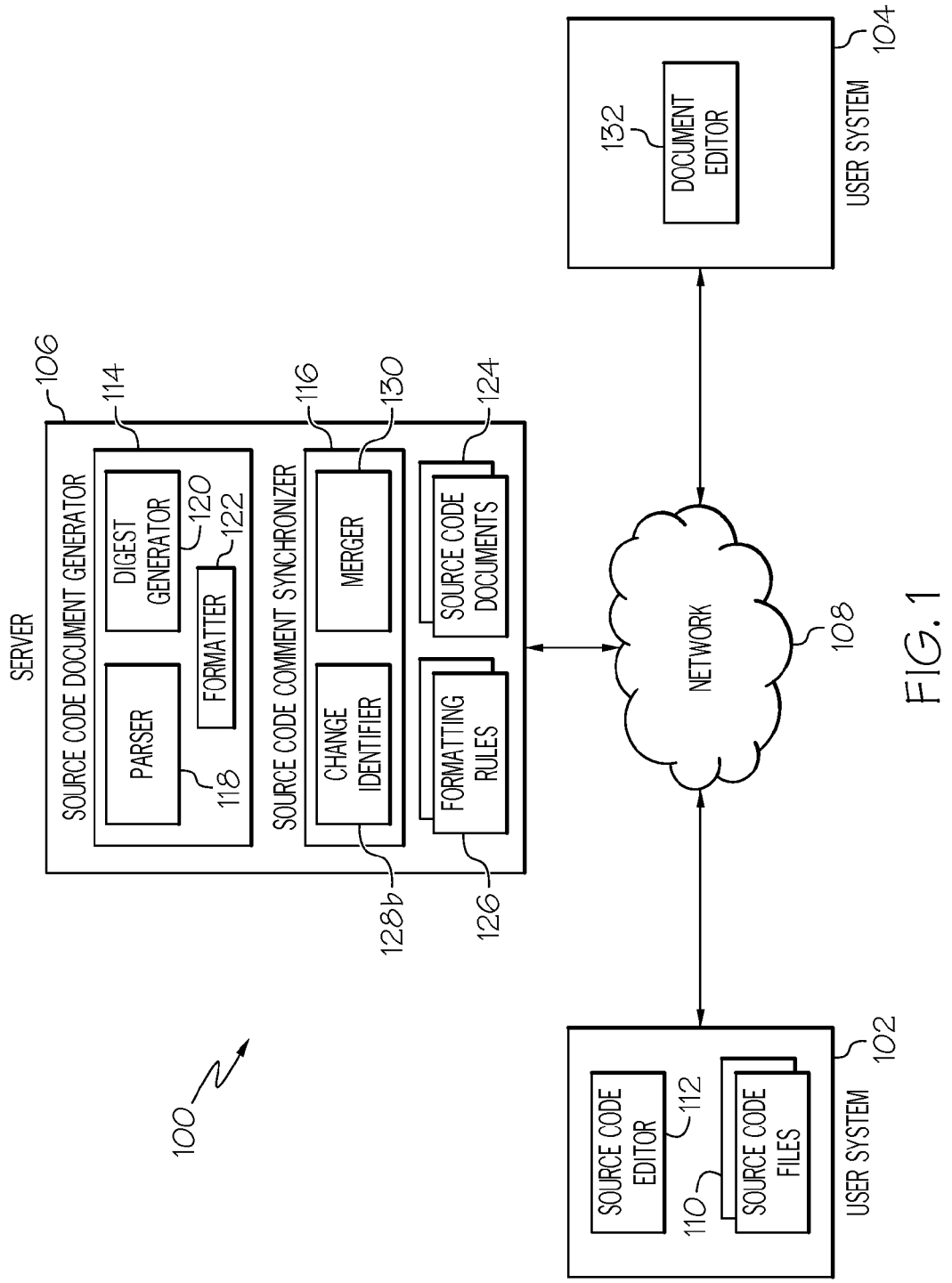
FIG. 1 is a block diagram illustrating one example of operating environment, according to one embodiment of the present disclosure.

FIG. 1 shows one example of an operating environment for synchronizing source code comments with text documents. The operating environment 100 comprises a plurality of information processing systems. For example, the operating environment 100 comprises one or more user systems 102, 104 and one or more server systems 106 that are communicatively coupled to a network 108. At least a first of the user systems 102 comprises source code files 110 and a source code editor 112. It should be noted that one or more of these components can also be situated on a remote information processing system as well. The source code files 110 comprise, among other things, programming instructions/statements and comments. Source code comments are added to the source code by a user/programmer. Comments annotate the programming instructions/statements, variables, operators, and/or the like within the source code, and generally provide a more reader-friendly description of the source code items being annotated.

The server system(s) 106 comprises a source code document generator (SCDG) 114 and a source code comment synchronizer (SCCS) 116. It should be noted that one or more of these components can also be situated on at least one of the user systems 102, 104. It should also be noted that the SCDG 114 and/or the SCCS 116 can be part of the source code editor 112, and vice versa. Also, the SCCS 116 can be part of the SCDG 114, and vice versa. The SCDG 114, in one embodiment, comprises a source code parser 118, a digest generator 120, and a formatter 122. The SCDG 114 takes as input source code files 110 and generates one or more source code documents 124 comprising at least the source code comments from the inputted source code file 110. In some embodiments, the source code documents 124 also comprise at least a portion of the source code from the source code file 110 as well. In some embodiments, the source code documents 124 may be stored on the user system(s) 104 comprising the document editor 132.

In one embodiment, the generated source code document 124 is a markup document such as (but not limited to) a HyperText Markup Language (HTML) document, a Darwin Information Typing Architecture (DITA) document, and/or the like. The source code document 124 comprises the source code comments (and optionally at least a portion of the source code) from the corresponding source code file 110 formatted according one or more formatting rules 126. The SCDG 114 and each of its components are discussed in greater detail below.

The SCCS 116 comprises a change identifier 128 and a merger 130. The SCCS 116 synchronizes changes made to the source comment material within a source code document 124 with the comments in the source code file 110. The SCCS 116 also synchronizes changes made to source comments within a source code file 110 with a source code document 124 previously generated for the source code file 110. The SCCS 116 and its components are discussed in greater detail below.

At least a second of the user systems 104 comprises a document editor 132. The document editor 132 enables a user such as a technical writer to view and edit source code documents 124. For example, the document editor 132 displays the text of a source code document 124 to a user based on the format defined by the source code document 124. The user then reviews and/or edits the text/formatting of the source code document 118 via the document editor 132. As will be discussed in greater detail below, the changes made to the text of the source code document 124 can then be merged into the corresponding source code file 110. It should be noted that the document editor 132 can be part of the source code editor 112 and/or the SCDG 114.

Synchronizing Source Code Comments with Text Documents

The following is a more detailed discussion on synchronizing source code comments with text documents. In one embodiment, a user such as a programmer/developer generates source code via the source code editor 112 and stores the source code in a source code file 110. FIG. 2 shows one example of a portion of source code created by the user. In particular, FIG. 2 shows a window 202 of a source code editor 112 presenting a portion of source code 204 for a source code file 110 entitled "Vwap.spl". The portion of source code 204 in this example comprises comments 206 (lines 1 to 24) and a source code artifact 208 such as a composite operator ("Vwap" starting on line 25) associated with the comments 206. The comments 206, in this example, provide an overview/description of the source code artifact 208 with respect to a given input, and also identify other operators/functions utilized or associated with the source code artifact 208.

In one embodiment, the comments 206 are created utilizing various syntax and rules defined in the specification for the programming language being used to create the source code 206. For example, programming languages generally adhere to a defined specification that defines the syntax and semantics of the language. These specifications often define how comments are to be entered in the source code, and can also specify/define characters or group of characters that are to be used when entering comments. For example, FIG. 2 shows that the character group "/" 210 has be utilized to designate the beginning of a descriptive block of comments 206** and the character group "*/" 212 has been utilized to designate the end of the descriptive block of comments 206.

In addition, a user can enter the source code comments 206 according to formatting specifications/rules 126 associated with the SCDG 114. These specifications/rules 126 identify characters or group of characters that a user can enter before and/or after text in the comments 206 to have formatting tags applied thereto. For example, FIG. 2 shows that the user has entered a "=" 214 symbol before the text "Overview" and "Example" in lines 2 and 12, respectively. In this example, the "=" symbol 214 instructs the SCDG 114 to style the text "Overview" and "Example" in a bold font. FIG. 2 also shows that the user has entered the characters "|||" 216 before and after source code artifact names such as "out" and "data" in line 4, "Aggregate" in line 7, "FileSink" in line 20, "Bargain-Index" in line 21, and "vwap" and "index" in line 22. In this example, the "|||" character group 216 instructs the SCDG 114 to apply an italicized style to the text between the beginning and ending "|||" character groups.

Once the user/programmer has finished adding source code and/or comments the source code file 110 is saved and stored. The programmer, technical writer, and/or any other user are then able to submit the source code file 110 to the SCDG 114. The SCDG 114 receives the source code file 110 as input and generates a source code document 124 for the source code file 110. In one embodiment, when the SCDG 114 receives the source code file 110 the source code parser 118 parsers the file 110 to identify source code and comments in the file 110. For example, the parser 118 is configured with various programming language rules/specifications for one or more programming languages that allow the parser 118 to determine what text in the source code file 110 is source code and what text is a comment. In one embodiment, the parser 118 is configured to identify comments by detecting one or more characters indicating the start and/or end of a comment or comment block. For example, the parser 118 looks for characters or character groups such as "//", "#", "/**" "*/", "#|" "|#", and/or the like when identifying comments. The parser 118, in one embodiment, identifies text within the file 110 that is not associated with a comment character as source code.

Once the source code comments 206 are identified by the parser 118, the SCDG 114 extracts the comments 206. The formatter 122 then applies one or more markup tags to the extracted comments 206. In one embodiment, the formatter 122 applies the markup tags based on or more formatting rules/specifications 126. These formatting rules/specifications 126 instruct the formatter 122 on how to stylize/format the comment text based on a current state of the text. For example, the formatting rules/specifications 126 configure the formatter 122 to format one or more lines of comment text as a paragraph when these one or more lines are immediately preceded and followed by one or more lines of white space (blank lines). These one or more lines of comment text are formatted as a paragraph, for example, by applying one or more markup tags for paragraphs (e.g., "<p>" and "</p>") to the identified lines of comment text.

The formatting rules/specifications 126 also configure the formatter 122 to identify special formatting characters or a group of characters associated with comment text. For example, the formatter 122 is configured to detect formatting characters such as (but not limited to) "=", "||", and or the like. When formatting characters are detected, the formatter 122 applies markup tags to the comment text associated with the formatting characters based on the style defined for these formatting characters by the formatting rules/specifications 126. For example, if the formatting rules/specifications 126 state that comment text associated with the "=" symbol is to be stylized with a bold font, the formatter 122 applies a markup tag such as (but not limited to) <strong class="ph b">, which stylizes the text with a bold font.

In addition to extracting and formatting the source code comments from the source code file 110, the SCDG 114 also creates an entry for the source code document 124 comprising metadata associated with the source code file 110. In this embodiment, the SCDG 114 creates an entry for the source code document 124 comprising the file name of the source code file 110, a digest for the source code file 110, and a timestamp of the most recent update for the source code file 110. The digest for the source code file 110, in one embodiment, is generated by the digest generator 120. The digest generator 120 applies one or more hashing operations on a source code file 110 to obtain a hash value or digest that uniquely represents the source code file 110. In other embodiments, the digest generator 120 applies one or more hashing operations on at least one portion of the source code file 110 to obtain a hash value or digest that uniquely represents the at least one portion of the source code file 110. It should be noted that, in one embodiment, prior to executing the hashing operation the formatter 122 first translates the markup tags as discussed above.

The SCDG 114 also creates an entry for each source code artifact in the source code file 110 associated with at least one line of comments. In one embodiment, this metadata entry comprises an identifier of the source code artifact, a location (e.g., line number(s)) of the artifact within the source code, and a digest for the comments associated with the source code artifact. It should be noted that the digest generator 120, in one embodiment, is configured to calculate a separate digest for each line of comments associated with source code artifact. However, in another embodiment, the digest generator 120 calculates a single digest for a block of comments (i.e., two or more lines of comments grouped together). The formatter 122 of the SCDG 114, in one embodiment, applies one or more markup tags to the metadata entries to hide the metadata when the generated source code documents 124 are presented to the user in the document editor 132.

Figure 3:
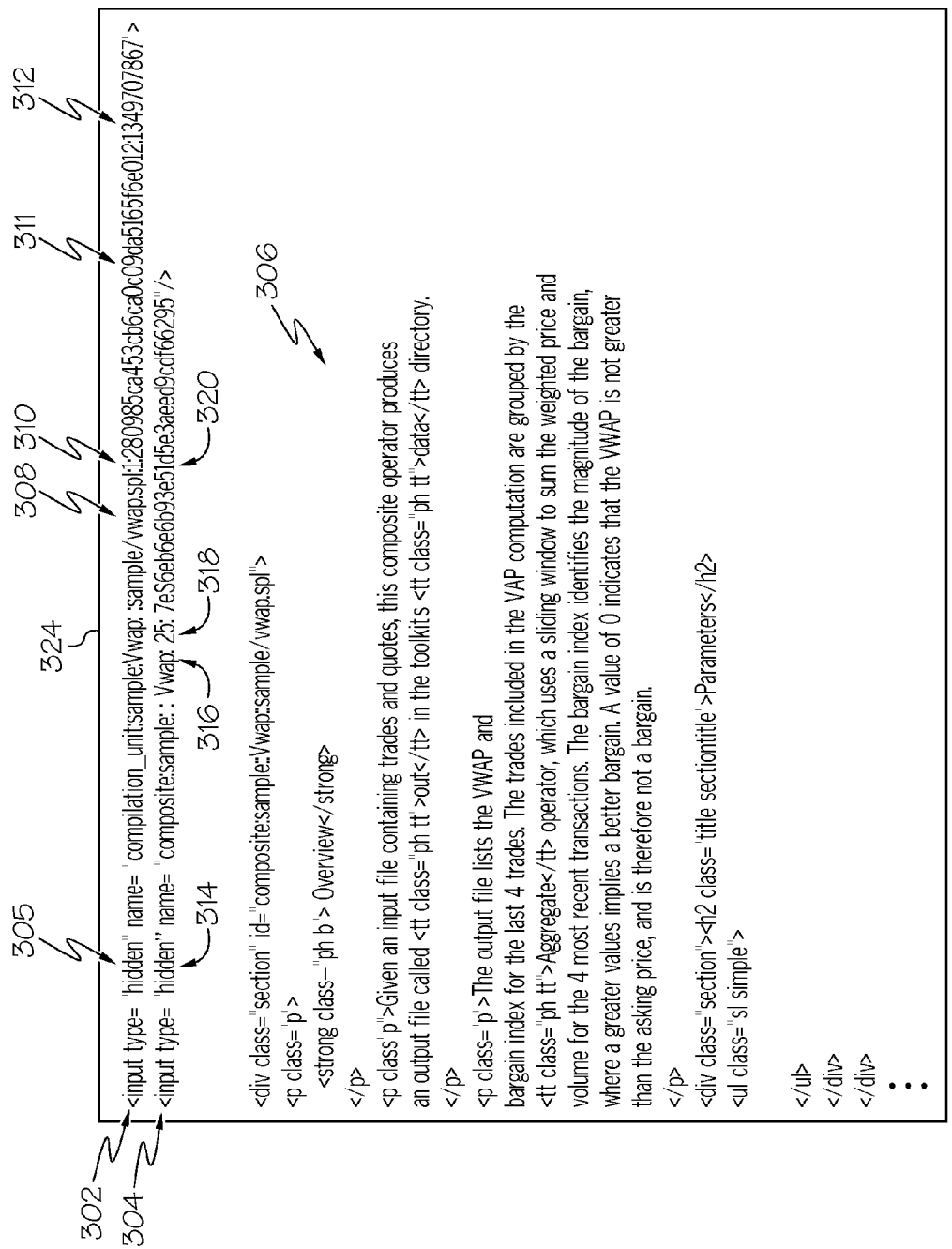
FIG. 3 illustrates one example of a source code document for the source code file of FIG. 2, according to one embodiment of the present disclosure.

The output of the SCDG 114 is a source code document 124 comprising the comments extracted from the source code file 110, the markup tags applied to the comments, and the hidden metadata. FIG. 3 shows one example of a source code document 324 generated for the source code file shown in FIG. 2. It should be noted that FIG. 3 only shows a portion of the source code document 324 for ease of readability. In the example shown in FIG. 3, the source code document 324 comprises a first hidden entry 302 and a second hidden entry 304. The first hidden entry 302 comprises a markup tag 305 that hides the entry 302 when the source code document 324 is displayed to the user via the document editor/processor 132. This entry 302 further comprises the name 308 of the source code file 110 associated with the source code document 324, line number information 310, a digest 311 generated for the source code file 110, and a time stamp 312 of the last update to the source code file 110. It should be noted that the line number information 310 for the source code file 110 and/or the digest 311 for the source code file 110 are not required.

The second hidden entry 304 also comprises a markup tag 314 that hides the entry 304 when the source code document 324 is displayed to the user via the document editor/processor 132. This entry 304 further comprises the name 316 of the source code artifact 208 associated with comments 206 in the source code file 110, a location (e.g., line numbers) 318 of the source code artifact 208 in the source code file 110, and the digest 320 generated for the comments 206 associated with the source code artifact 208. The source code document 324 further comprises the comments 206 extracted/copied from the source code file 110 for the source code artifact 208 identified in the second hidden entry 304 along with the markup tags applied by the formatter 120.

The source code documents 124 generated by the SCDG 114 are utilized, in one embodiment, by users such as technical writers to generate documentation for the source code artifacts within the source code. In this embodiment, a user loads a source code document 124 into the document editor 132. The document editor 132 the presents the content of the source code document 124 to the user via one or more windows. The document editor 132 utilizes the markup tags within the source code document 124 to format and present the source code document content to the user.

Figure 4:
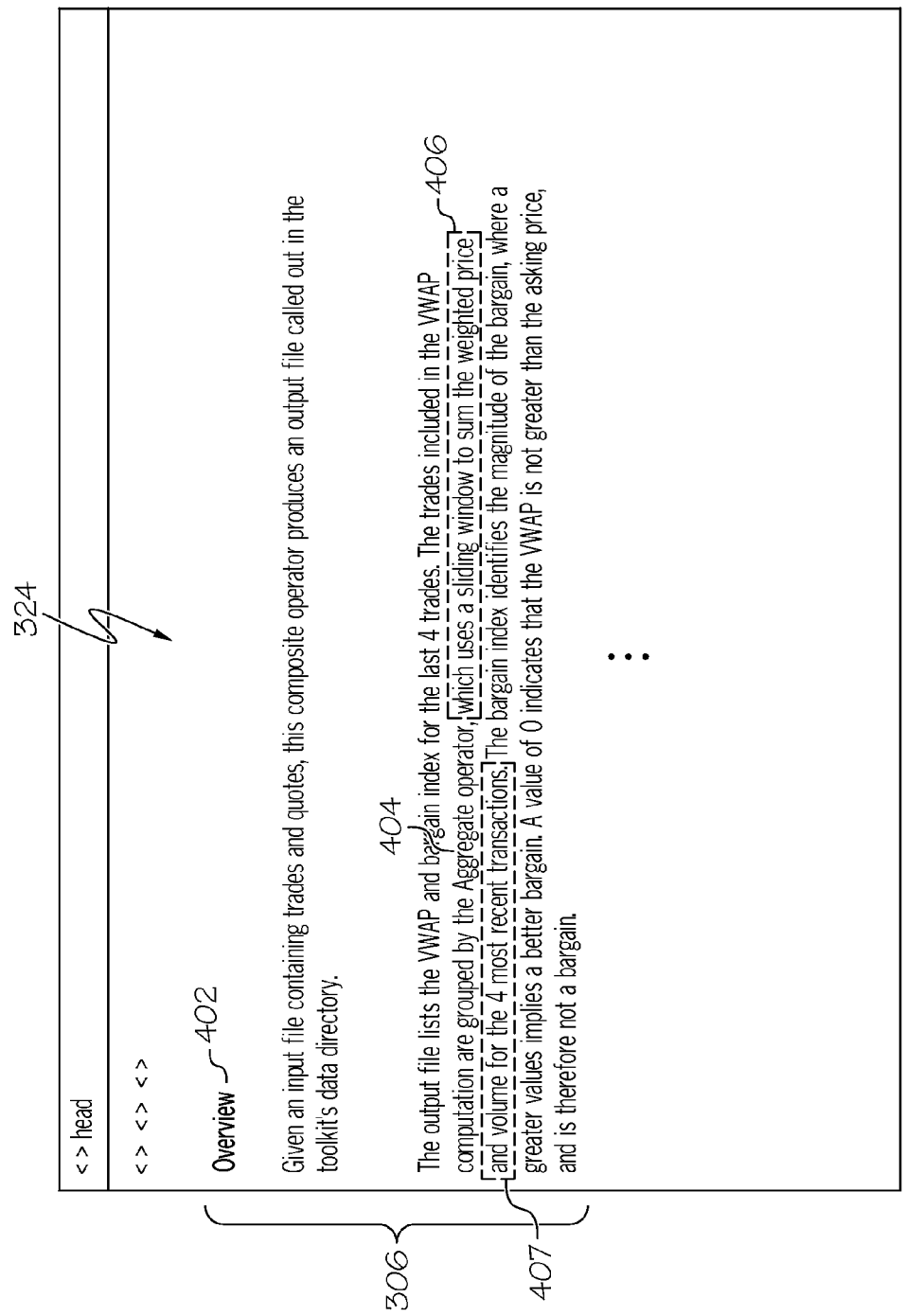
FIG. 4 illustrates one example of presenting the source code document of FIG. 3 to a user, according to one embodiment of the present disclosure.

FIG. 4 shows one example of the source code document 324 of FIG. 3 as presented to a user in a document editor/processor 132. As can be seen, the source code comments 306 within the source code document 324 are presented to the user based on the markup tags in the source code document 324. For example, paragraphs have been created based on the paragraph markup tags in the source code document 324. Also, some comment text has been stylized based on the style tags in the source code document 324. For example, the text "Overview" 402 has been displayed with a bold font and the text "Aggregate" 404 has been italicized.

The user edits the documents by changing the formatting, adding/removing text, and/or the like. For example, FIG. 4 shows that the user has added a line of text 406, 407. Once the user has completed reviewing/editing the source code document 324 the user saves the source code document 324. A user such as the author of the source code file 110 is then able to merge the changes made in the source code document 324 into the corresponding source code file 110. For example, a user loads both the source code file 110 and its corresponding source code document 324 into the SCCS 116. The change identifier 128 of the SCCS 116 analyzes the source code document 324 to identify any changes that have occurred since the document 324 was created or since the document 324 was last analyzed.

In one embodiment, changes are detected by calculating the digest of each comment line or block. The change identifier 128 then compares this digest to the corresponding digest in the hidden entry 304 of the document 324 for the source artifact associated with the comments. If the digests do not match then the change identifier 128 determines that a change was made to the corresponding comment text in the source code document 324. If the digests do match, the change identifier 128 determines that no changes were made to the corresponding comment text in the source code document 324. The change identifier 128 performs this process for each set of comments within the source code document 324.

If no changes are detected in the source code document 324 the SCCS 116 notifies the user that no changes were found.

However, if a change is detected in the source code document 324 the merger 130 replaces the comment text in the source code file 110 with the corresponding comment text from the source code document 324. For example, when a change is detected in a section of comment text from the source code document 324 the merger 130 extracts comment text from this section of the document 324. The merger 130 then replaces the corresponding comment text in the source code file 110 with the extracted comment text. Also, as part of replacing the text in the source code file 110 with updated text from the source code document 124, the formatter 122 can map the markup in the comments of the source code document 124 (if any) to the equivalent markup used in the source code file 110. The formatting rules 126 define the mappings between the two markups.

In one embodiment, the merger 130 identifies the comment text to be replaced in the source code file 110 based on the line number information provided in the hidden entries 302, 304 of the source code document 324. For example, the second entry 304 shown in FIG. 3 shows that the source code artifact 208 associated with the comments begins on line 25. Therefore, the merger 130 determines that the corresponding comments start on line 2 and end on line 23. It should be noted that the entries 302, 304 within the source code document 324 can also explicitly identify the lines of the source code comprising the comments as well. In the current example, when the merger 130 extracts the comment text from the source code document 324 it replaces the corresponding comment text in the source code file on lines 2 to 23 with the updated comment text from the source code document 324.

Once the source code file 110 has been updated, the SCCS 116 saves the file 110. The user is then able to view the updated source code file 110 in the source code editor 112. For example, FIG. 5 shows a portion of the updated source code file 110 as presented to the user in the source code editor 112. As can be seen, lines 7 to 8 of the source code file 110 now comprise the new comment text 406 as entered by the technical writer in source code document 324. In one embodiment, the source code editor 112 visually alters the new/updated text so that the user can easily identify any differences between the previous version of the source code file and the updated version.

It should be noted that, in one embodiment, the document editor 132 can automatically send the source code document 324 to the SCCS 116 after a user updates the document 324. In this embodiment, the SCCS 116 automatically detects the changes/differences between the source code document 324 and corresponding source code file 110 without a user, such as a programmer, initiating the synchronization process discussed above. Once the SCCS 116 detects the changes/differences between the source code document 324 and the corresponding source code file 110 the SCCS 116 automatically updates the source code file 110, as discussed above. In one embodiment, the SCCS 116 identifies the source code file 110 to update based on the metadata entry 302 within the source code document 324 associated with the file 110. The SCCS 116 can then automatically retrieve the source code file 110 for updating. Once updated the SCCS 116 saves the updated source code file 110. The SCCS 116 can then notify a user that the source code file 110 has been updated.

The SCCS 116 not only synchronizes comments in a source code file 110 with changes made in a corresponding source code document 324, but also synchronizes text in a source code document 324 with changes made to comments in a source code file 110. In this embodiment, after a source code document 124 has been generated for a source code file 110, the SCCS 116 detects when changes have been made to the corresponding source code file 110 and automatically updates the source code document 124. This allows for a bi-directional mapping between the source code file 110 and the source code document 324. The formatter 122 support this bi-directional mapping based on the formatting rules 126. In one embodiment, each direction of mapping utilizes separate instances of the formatter 122; however, this is not required. If the source code document 110 was updated (without any concurrent updates to the source code document 324), a new source code document 124 is generated with the changes detected in the corresponding source code file 110. The previous source code document is replace with this new source code document.

In one embodiment, the SCCS 116 also detects and rectifies the situation where the source code file 110 and the source code document 132 are concurrently updated by the developer and technical writer, respectively. In this situation, the SCCS 116 alerts the user that concurrent update has occurred to the same comment lines. In one embodiment, the user manually resolves conflicting updates to the comments, if any. The merged comment text is written to both the source code file 110 and source code document 324. In one embodiment, both the source code file 110 and source code document 324 can be updated by updating the source code file (110, and then invoking the SCDG (114) to generate the source code document 324. The case of a concurrent update may be detected if the timestamp associated with the source code file 110 is greater than timestamp of the document meta-data tag 302 and the timestamp associated with source code document 324 is greater than then the timestamp in document meta-data tag 302. In one embodiment, the timestamps associated with the source code file 110 and source code document 324 can be maintained by the computer's operating system, which timestamps the last time the file was saved. If a concurrent update has not occurred, then a replacement operation is performed instead of a merger operation.

Operational Flow Diagram

Figure 6:
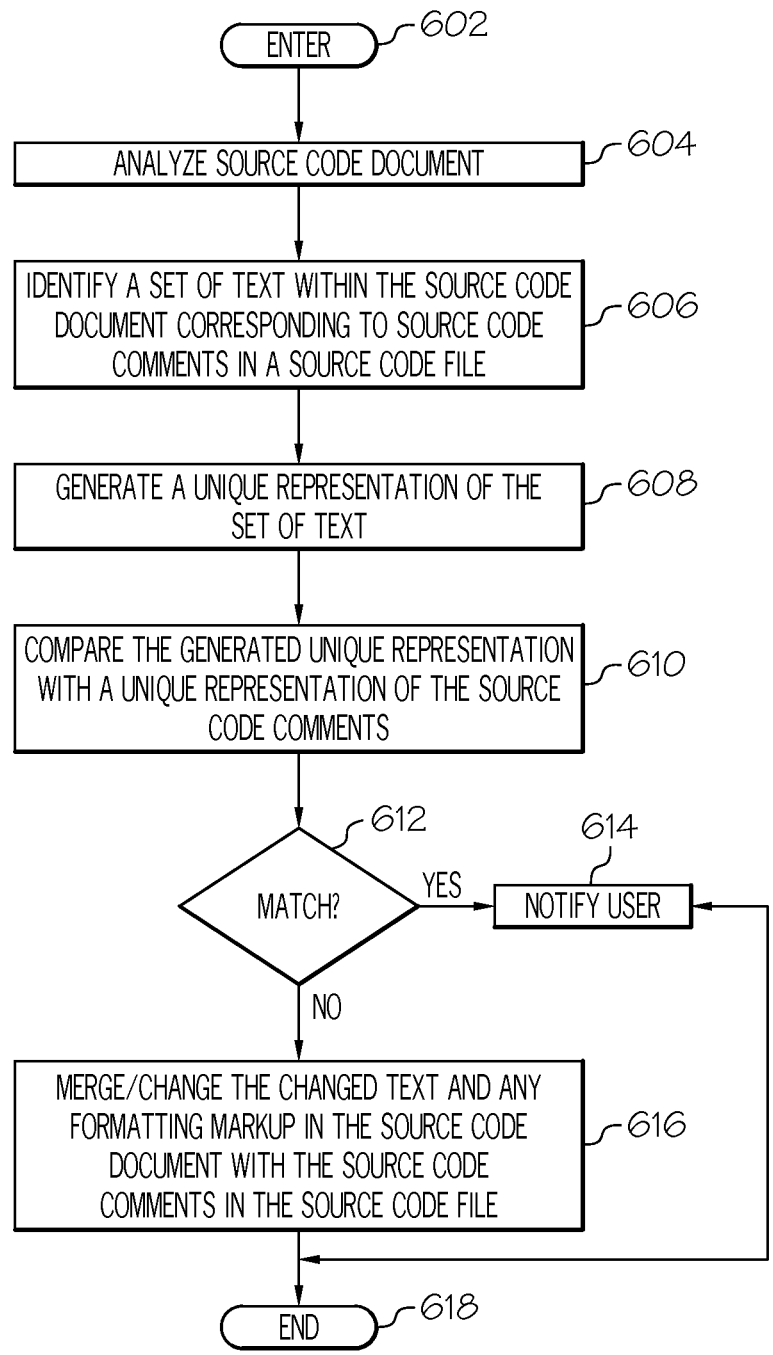
FIG. 6 is an operational flow diagram illustrating one example process of synchronizing source code comments in a source code file with a corresponding source code document, according to one embodiment of the present disclosure.

FIG. 6 illustrates one example of an overall process of synchronizing source code comments with source code document text according to one embodiment of the present disclosure. This flow diagram illustrates the architecture, functionality, and operation of possible implementations of systems, methods, and computer program products according to various embodiments herein. In this regard, each block in the flow diagram may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently (or contemporaneously), or the blocks may sometimes be executed in the reverse order, depending upon the functionality involved. It will also be noted that each block of the flow diagram illustration, and combinations of blocks in the flow diagram, can be implemented by special purpose hardware-based systems that perform the specified functions or acts, or combinations of special purpose hardware and computer instructions.

Referring to FIG. 6, the SCCS 116 enters, at step 602, the operational sequence and then proceeds, at step 604, analyze a source code document 324 corresponding to a source code file 110. The source code document 124 at least comprises a set of text corresponding to a set of source code comments in the source code file 110, a plurality of formatting/stylizing tags associated with the set of text, and a set of metadata, and a unique representation for one or more of the source code file 110 and the set of source code comments. The unique representations, in one embodiment, are digests generated by applying one or more hashing operations on the source code file and the set of source code comments, respectively.

The SCCS 116, at step 606, identifies the set of text within the source code document 124. The SCCS 116, at step 608, generates a unique representation for the set of text. In one embodiment, generating the unique representation includes mapping the markup in the source code file 110 to a canonical or normal format. For example, text in the source code file and the source code document may include markups using different schema (e.g., a ||| designates italics in the source code file, and <i> is used to italicize text in the source code document. When generating the unique representation, the SCCS 116 can map the markup tags to a canonical representation, and then apply the hashing operation. In one embodiment, DITA may provide this canonical markup.

The SCCS 116, at step 610, compares the unique representation generated for the set of text with the unique representation of the set of source code comments in the source code document. The SCCS 116, at step 612, determines if the unique representations match. If so, the SCCS 116, at step 614, notifies a user that no changes to the source code comments were found in the source code document. However, if the unique representations fail to match, the SCCS 116, at step 616, merges/changes the changed text and formatting markup (if any) in the source code document 124 with the source code comment in the source code file 110. If the source code document 124 was changed without any concurrent changes to the source code file 110, the SCCS 116 updates the source code comments in the source code file 110 with the set of text from the source code document 124. If concurrent updates occurred, the merging process discussed above is performed. The control flow exits at step 618.

Information Processing System

Figure 7:
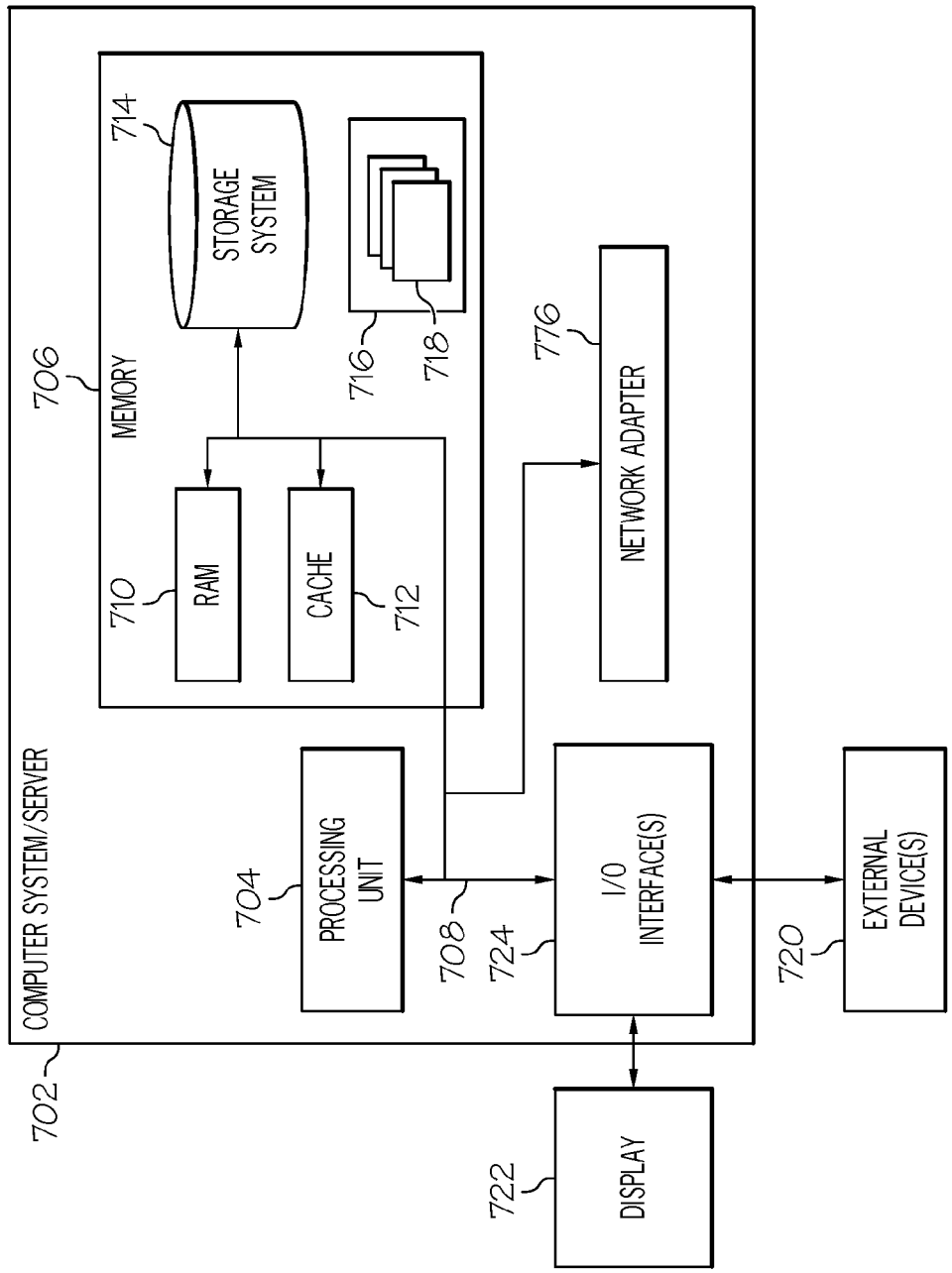
FIG. 7 is a block diagram illustrating one example of an information processing system according to one embodiment of the present disclosure.

Referring now to FIG. 7, this figure is a block diagram illustrating an information processing system, such as any of the systems 102, 104, 106 shown in FIG. 1, which can be utilized in various embodiments of the present disclosure. The information processing system 702 is based upon a suitably configured processing system configured to implement one or more embodiments of the present invention. Any suitably configured processing system can be used as the information processing system 702 in embodiments of the present invention. The components of the information processing system 702 can include, but are not limited to, one or more processors or processing units 704, a system memory 707, and a bus 708 that couples various system components including the system memory 706 to the processor 704.

Although not shown in FIG. 7, the components the user systems 102, 104 and/or the server system 108 of FIG. 1 can reside within the main memory 706 and/or the processor 1004. These components can also be a separate hardware component as well.

The bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 706 can also include computer system readable media in the form of volatile memory, such as random access memory (RAM) 710 and/or cache memory 712. The information processing system 702 can further include other removable/non-removable, volatile/non-volatile computer system storage media. By way of example only, a storage system 714 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 708 by one or more data media interfaces. The memory 706 can include at least one program product having a set of program modules that are configured to carry out the functions of an embodiment of the present invention.

Program/utility 716, having a set of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of embodiments of the present invention.

The information processing system 702 can also communicate with one or more external devices 720 such as a keyboard, a pointing device, a display 722, etc.; one or more devices that enable a user to interact with the information processing system 702; and/or any devices (e.g., network card, modem, etc.) that enable computer system/server 702 to communicate with one or more other computing devices. Such communication can occur via I/O interfaces 724. Still yet, the information processing system 702 can communicate with one or more networks such as a local area network (LAN), a general wide area network (WAN), and/or a public network (e.g., the Internet) via network adapter 727. As depicted, the network adapter 726 communicates with the other components of information processing system 702 via the bus 708. Other hardware and/or software components can also be used in conjunction with the information processing system 702. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit"," "module", or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, with a processor of an information processing system, for synchronizing comments in a source code file with text of a source code document, the method comprising:
comparing a source code document to a corresponding source code file, the source code document comprising a set of text corresponding to a set of source code comment text in the corresponding source code file, the source code document being configured to display the set of text in a stylized format when presented to a user, wherein the comparing comprises:
generating a unique representation of the set of text in the source code document by applying one or more hashing operations on the set of text, and
comparing the unique representation of the set of text with the unique representation of the source code comment text;
determining, based on the comparing, that the set of text in the source code document is different than the set of source code comment text in the source code file; and
automatically changing, based on the determining, at least the set of source code comment text in the source code file based on the set of text from the source code document.

2. The method of claim 1, wherein at least one of the set of text in the source code document and the set of source code comment text in the source code file is associated with a plurality of markup tags.

3. The method of claim 1, wherein the source code document further comprises a set of metadata associated with the set of source code comment text in the source code file, the metadata comprising at least a unique representation of the source code comment text.

4. The method of claim 3, wherein the metadata is hidden from view when the source code document is presented to the user.

5. The method of claim 1, further comprising:
generating the source code document, wherein the generating comprises:
analyzing the source code file;
identifying, based on the analyzing, the set of source code comment text within the source code file;
extracting, based on the identifying, the set of text from the set of source code comment text that has been identified;
generating, based on the identifying, a set of metadata for at least the set of text, the set of metadata comprises at least a unique representation of the set of text, and wherein the set of metadata at least identifies one or more line numbers in the source code file associated with the set of text; and
applying a plurality of markup tags to the set of text, the plurality of markup tags at least one of formatting and stylizing the set of text when presented to the user.

6. An information processing system for synchronizing comments in a source code file with text of a source code document, the information processing system comprising:
memory;
at least one processor communicatively coupled to the memory; and
a source code comment synchronizer communicatively coupled to the memory and the processor, wherein the source code comment synchronizer is configured to perform a method comprising:
comparing a source code document to a corresponding source code file, the source code document comprising a set of text corresponding to a set of source code comment text in the corresponding source code file, the source code document being configured to display the set of text in a stylized format when presented to a user wherein the comparing comprises:
generating a unique representation of the set of text in the source code document by applying one or more hashing operations on the set of text, and
comparing the unique representation of the set of text with the unique representation of the source code comment text;
determining, based on the comparing, that the set of text in the source code document is different than the set of source code comment text in the source code file; and
automatically changing, based on the determining, at least the set of source code comment text in the source code file based on the set of text from the source code document.

7. The information processing system of claim 6, wherein the source code document further comprises a set of metadata associated with the set of source code comment text in the source code file, the metadata comprising at least a unique representation of the source code comment text.

8. The information processing system of claim 7, wherein the metadata is hidden from view when the source code document is presented to the user.

9. The information processing system of claim 6, wherein the method further comprises:
generating the source code document, wherein the generating comprises:
analyzing the source code file;
identifying, based on the analyzing, the set of source code comment text within the source code file;
extracting, based on the identifying, the set of text from the set of source code comment text that has been identified;
generating, based on the identifying, a set of metadata for at least the set of text, the set of metadata comprises at least a unique representation of the set of text, and wherein the set of metadata at least identifies one or more line numbers in the source code file associated with the set of text; and
applying a plurality of markup tags to the set of text, the plurality of markup tags at least one of formatting and stylizing the set of text when presented to the user.

10. A computer program product for synchronizing comments in a source code file with text of a source code document, the computer program product comprising:
a storage medium readable by a processing circuit and storing instructions for execution by the processing circuit for performing a method comprising:
comparing a source code document to a corresponding source code file, the source code document comprising a set of text corresponding to a set of source code comment text in the corresponding source code file, the source code document being configured to display the set of text in a stylized format when presented to a user, wherein the comparing comprises:
generating a unique representation of the set of text in the source code document by applying one or more hashing operations on the set of text, and comparing the unique representation of the set of text with the unique representation of the source code comment text;
determining, based on the comparing, that the set of text in the source code document is different than the set of source code comment text in the source code file; and
automatically changing, based on the determining, at least the set of source code comment text in the source code file based on the set of text from the source code document.

11. The computer program product of claim 10, wherein at least one of the set of text in the source code document and the set of source code comment text in the source code file is associated with a plurality of markup tags.

12. The computer program product of claim 10, wherein the source code document further comprises a set of metadata associated with the set of source code comment text in the source code file, the metadata comprising at least a unique representation of the source code comment text.

13. The computer program product of claim 12, wherein the metadata is hidden from view when the source code document is presented to the user.

14. The computer program product of claim 10, wherein the method further comprises:
generating the source code document, wherein the generating comprises:
analyzing the source code file;
identifying, based on the analyzing, the set of source code comment text within the source code file;
extracting, based on the identifying, the set of text from the set of source code comment text that has been identified;
generating, based on the identifying, a set of metadata for at least the set of text, the set of metadata comprises at least a unique representation of the set of text, and wherein the set of metadata at least identifies one or more line numbers in the source code file associated with the set of text; and
applying a plurality of markup tags to the set of text, the plurality of markup tags at least one of formatting and stylizing the set of text when presented to the user.

* * * * *